(12) United States Patent
Doig (10) Patent No.: US 9,782,806 B2
(45) Date of Patent: Oct. 10, 2017

(54) UNI-DIRECTIONAL PIPELINE PIG AND PIPELINE ASSEMBLIES

(76) Inventor: Ian Doig, Dora Creek (AU)

(*) Notice: Subject to any disclaimer, the term of this patent is extended or adjusted under 35 U.S.C. 154(b) by 762 days.

(21) Appl. No.: 14/239,661

(22) PCT Filed: Aug. 30, 2012

(86) PCT No.: PCT/AU2012/001015
§ 371 (c)(1),
(2), (4) Date: Feb. 19, 2014

(87) PCT Pub. No.: WO2013/044290
PCT Pub. Date: Apr. 4, 2013

(65) Prior Publication Data
US 2014/0209126 A1   Jul. 31, 2014

(30) Foreign Application Priority Data

Sep. 28, 2011   (AU) ................. 2011903993
Oct. 24, 2011   (AU) ................. 2011904386

(51) Int. Cl.
*B08B 9/055* (2006.01)
*F16L 55/38* (2006.01)
*F16L 55/44* (2006.01)
*F16L 55/128* (2006.01)

(52) U.S. Cl.
CPC ............ *B08B 9/055* (2013.01); *B08B 9/0553* (2013.01); *F16L 55/1283* (2013.01); *F16L 55/38* (2013.01); *F16L 55/44* (2013.01)

(58) Field of Classification Search
CPC .......... B08B 9/055; F16L 55/26; F16L 55/38; F16L 55/44
See application file for complete search history.

(56) References Cited

U.S. PATENT DOCUMENTS

| 3,107,696 A | 10/1963 | Ver Nooy |
| 4,069,535 A | 1/1978 | Cato |

(Continued)

FOREIGN PATENT DOCUMENTS

| CA | 2604183 C | 10/2006 |
| GB | 2217423 A | 10/1989 |

(Continued)

*Primary Examiner* — Randall Chin
(74) *Attorney, Agent, or Firm* — Coats & Bennett, PLLC (57) ABSTRACT

Pigs (10) are propelled forwards by a propulsion fluid in a pipeline (21). The pigs (10) have an upstream end (13), a downstream end (11), and an intermediate section (12). The intermediate section has a variable geometry chamber (16) associated therewith and one or more outwardly extending external pawl teeth (15). The pawl teeth are automatically displaceable outwardly relative to a longitudinal axis (9) in response to a pressure differential between a downstream pressure and an upstream pressure. The pig is configured such that a change in a geometry of the chamber in response to the pressure differential between the downstream pressure and the upstream pressure causes the one or more pawl teeth to automatically displace outwardly when the upstream pressure is less than the downstream pressure. When the pawl teeth are deployed, upstream displacement of the pig is inhibited. Various related systems (5) and methods are also disclosed.

18 Claims, 10 Drawing Sheets

(56) References Cited

U.S. PATENT DOCUMENTS

| | | | |
|---|---|---|---|
| 5,875,803 A * | 3/1999 | Leitko | B08B 9/0553 134/167 C |
| 6,241,424 B1 * | 6/2001 | Bath | F16L 1/26 15/104.061 |
| 6,368,418 B1 * | 4/2002 | Rowe | B08B 9/055 134/8 |
| 6,872,058 B2 | 3/2005 | Doig | |
| 7,832,431 B2 | 11/2010 | Doig | |
| 8,141,587 B2 | 3/2012 | Doig | |
| 8,261,777 B2 | 9/2012 | Doig | |
| 8,640,883 B2 | 2/2014 | Doig | |
| 2009/0083922 A1 | 4/2009 | Watson et al. | |
| 2013/0011209 A1 | 1/2013 | Doig | |

FOREIGN PATENT DOCUMENTS

| | | |
|---|---|---|
| WO | 2011094798 A1 | 8/2011 |
| WO | 2013044290 A1 | 4/2013 |

\* cited by examiner

UNI-DIRECTIONAL PIPELINE PIG AND PIPELINE ASSEMBLIES

FIELD OF THE INVENTION

The invention relates to pipelines and pipeline pigs, with particular application of some embodiments to pipelines for granular slurries.

BACKGROUND

WO 2011/094798, entitled "Pipeline conveyor systems," describes a system transporting granules in intervals between co-transported pigs within a pipeline. The system relies on check valves to inhibit reverse, or upstream, movement of spaced apart pigs and the slurries disposed therebetween. While such an approach is beneficial for many applications, there remains a need for alternative approaches, such as approaches that allow for alternative pump and check valve designs.

SUMMARY OF THE INVENTION

In one or more embodiments, a pipeline pig is provided. The pipeline pig comprises an upstream end, a downstream end, and an intermediate section disposed therebetween. The intermediate section has a variable geometry chamber associated therewith. The intermediate section also has one or more outwardly extending external pawl teeth. The one or more pawl teeth are automatically displaceable outwardly relative to a longitudinal axis in response to a pressure differential between a downstream pressure and an upstream pressure. The pig is configured such that a change in a geometry of the chamber in response to the pressure differential between the downstream pressure and the upstream pressure causes the one or more pawl teeth to automatically displace outwardly when the upstream pressure is less than the downstream pressure.

The pig may comprise a flexible exterior wall associated with the intermediate section, with the chamber circumferentially peripherally bounded by the flexible wall, and the one or more pawl teeth are configured to move with the flexible wall. The chamber may be fully enclosed. The pig may comprise a downstream facing wall that forms a downstream boundary of the chamber. The intermediate section may further comprise a substantially rigid annular wall extending in the chamber, the annular wall having a plurality of ports therethrough, with the one or more pawl teeth having mounting portions extending through the annular wall. The downstream facing wall may be disposed downstream of the intermediate section. The one or more pawl teeth may comprise at least first and second external pawl teeth extending outward away from the longitudinal axis and longitudinally spaced from each other. The one or more pawl teeth may circumferentially surround a longitudinal axis of the pig in a continuous fashion. The one or more pawl teeth may be rigid.

In some embodiments, the one or more pawl teeth are automatically displaceable inwardly and outwardly in response to a pressure differential between a downstream pressure and an upstream pressure; wherein a change in a geometry of the chamber in response to the pressure differential between the downstream pressure and the upstream pressure causes the pawl teeth to move inwardly and outwardly such that: a) the one or more pawl teeth automatically displace outwardly when the upstream pressure is less than the downstream pressure; and b) the one or more pawl teeth automatically displace inwardly when the upstream pressure is greater than the downstream pressure.

In pipeline embodiments, pipeline pigs are disposed in a pipeline, with each pipeline pig comprising: an upstream end, a downstream end, and an intermediate section disposed therebetween; the intermediate section having a variable geometry chamber associated therewith; the intermediate section further having one or more outwardly extending external pawl teeth; the one or more pawl teeth being automatically displaceable outward into engagement with the interior surface of the pipeline, in response a change in a geometry of the chamber caused by a pressure differential between a downstream pressure and an upstream pressure in the pipe, such that the upstream movement of the pipeline pig is prevented when the upstream pressure is less than the downstream pressure; wherein downstream movement of the pipeline pig is not prevented by engagement of the one or more pawl teeth with the pipeline interior surface.

The pawl teeth may advantageously be automatically displaceable inwardly out of engagement with the pipeline interior surface when the upstream pressure is greater than the downstream pressure, and automatically displaceable outwardly into engagement with the pipeline interior surface when the downstream pressure is greater than the upstream pressure. The pipeline pig may comprise a flexible exterior wall in the intermediate section; wherein an outer surface of the exterior wall automatically abuts the pipeline interior surface to form a seal against upstream flow of fluid when the downstream pressure is greater than the upstream pressure and automatically moves away from the pipeline interior surface when the downstream pressure is less than the upstream pressure allowing fluid from upstream to surround the exterior wall. A first tapered rim may encircle the front end of the pig, with a second tapered rim encircling the rear end of the pig. The tapering rims may taper towards an edge which contacts the inside surface of the pipe within which the pipeline pig is being forwardly propelled, to thereby form travelling seals. The tapered rims may have slits allowing fluid upstream of the pipeline pig to pass downstream. Advantageously, the first tapered rim slits are smaller and fewer than the second tapered rim slits, which restricts the flow rate of fluid exiting the space between the first and second tapered rims, and allows the pressure in that space to closely approach the upstream fluid pressure to push the exterior wall surface inwards and move the pawl teeth inwards away from the pipe wall, thereby facilitating downstream movement of the pig. The tapered rim slits may allow some of the fluid upstream of the pipeline pig to pass downstream, allowing some of the upstream propulsion fluid to by-pass the pig while the pig is moving downstream.

The pipeline may have a propulsion section comprising: a propulsion unit configured to move pipeline pigs along the pipeline; an upstream section disposed upstream of the propulsion unit; a downstream section disposed downstream of the propulsion unit. The pipeline pig discussed above may be a first pipeline pig, and the assembly may further comprise a second pig similar to the first pipeline pig. The first pipeline pig is disposed in the upstream section of the propulsion section and inhibited from upstream movement, and the second pipeline pig is disposed in the downstream section of the propulsion section and inhibited from upstream movement. In some embodiments, the propulsion section may further comprise a tubular chamber having a pumping space, with the tubular chamber configured for pigs to flow therethrough, and the propulsion unit may be configured to alternately supply motive fluid to and remove motive fluid from the pumping space.

In one embodiment, the present invention provides a method of pumping materials through a pipeline. The method includes disposing a plurality of pipeline pigs in the pipeline such that the pipeline pigs are disposed in spaced relation to each other, with material to be pumped disposed therebetween; the plurality of pipeline pigs including a first pipeline pig. The method includes pumping the pigs in a downstream direction. The method includes automatically changing the configuration of the first pipeline pig during the pumping. The changing the configuration of the first pipeline pig comprises 1) automatically deploying one or more pawl teeth of the first pipeline pig outwardly into engagement with an interior of the pipeline in response to a pressured differential between a downstream pressure experienced by the first pipeline pig and an upstream pressure experienced by the first pipeline pig being such that the upstream pressure is less than the downstream pressure; b) automatically retracting the one or more pawl teeth inwardly in response to the pressure differential being such that the upstream pressure is greater than the downstream pressure. The method is such that upstream movement of the first pipeline pig is inhibited by engagement of the one or more pawl teeth with the interior surface of the pipeline. All or some of the pigs may be as described herein. Thus, in some embodiments, the first pipeline pig may comprise a variable geometry chamber, and the changing the configuration of the first pipeline pig may comprise changing the geometry of the chamber in response to changes in polarity of the pressure differential. The pigs advantageously pass through propulsion sections of the pipeline while remaining disposed in the pipeline and separated from adjacent pigs by the material to be pumped (i.e., the pigs follow the same path through the pipeline as the material being pumped, not a separate bypass path).

Several examples of propulsion units with pipeline pigs operating as moving check valves, and related methods, are presented.

DETAILED DESCRIPTION OF PREFERRED EMBODIMENTS

Discussed below are various pipeline pigs and related assemblies and methods. The pigs are discussed below in the context of segregating a slurry being carried by the pipeline into discrete segments or batches. However, it should be understood that the invention is not so limited, and the pigs may be used with pipelines carrying any fluid or slurry.

Figure 1:
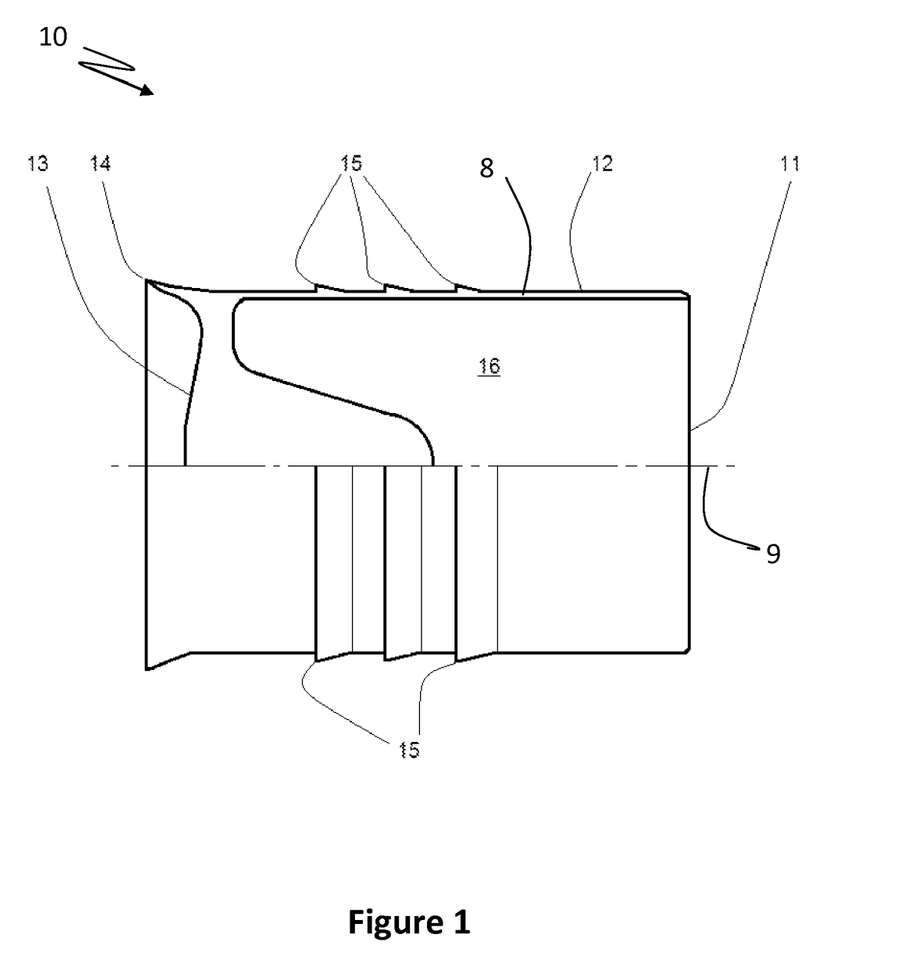
FIG. 1 shows a side view in half cross section of one embodiment of a pig of the current invention with a tubular shape.
Figure 2:
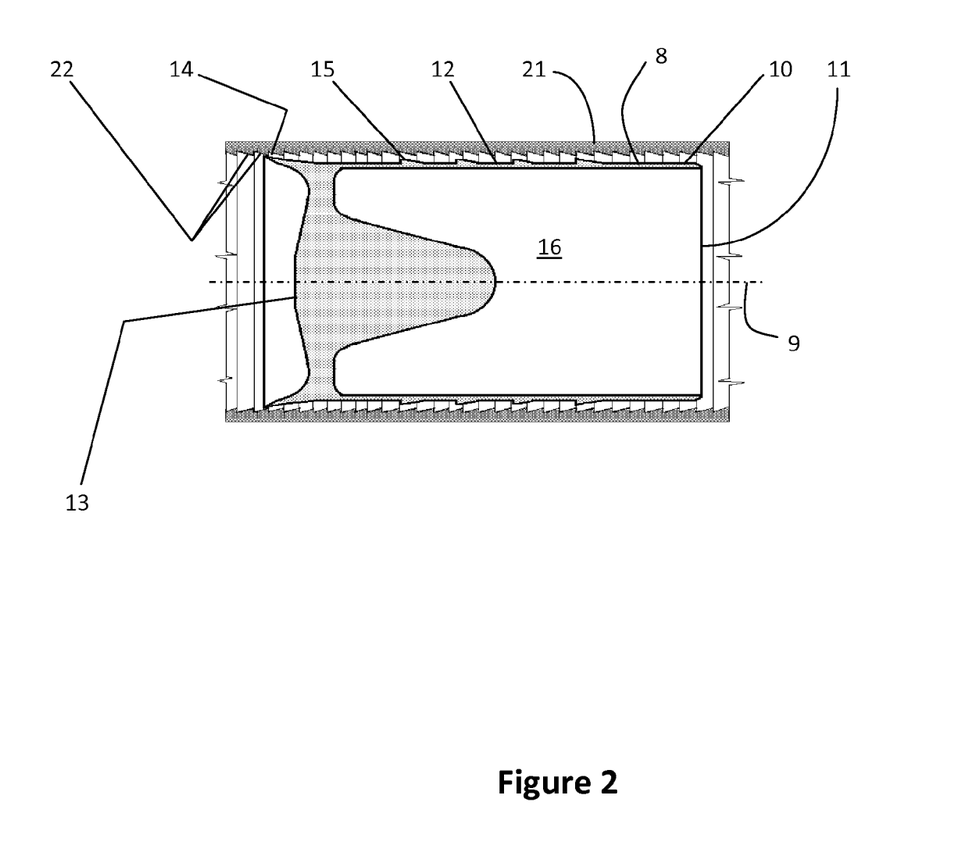
FIG. 2 shows a cross-sectional side view of the pig of FIG. 1 located within a section of a pipeline.

Referring to FIGS. 1-2, the pig, generally indicated at 10, may have a generally tubular shape about longitudinal axis 9. The pig 10 has a downstream end 11 that is shown as open in FIGS. 1-2, and an upstream end 14 that is advantageously closed. An intermediate section 12 is disposed between the downstream end 11 and the upstream end 14, and includes resilient outer or peripheral walls 8 that peripherally surround a variable geometry chamber 16, circumferentially relative to longitudinal axis 9. A closing wall 13 may form an upstream boundary of the chamber 16. The intermediate section 12 includes at least one, and advantageously a plurality of, external pawl teeth 15 that are formed by outwardly extending protrusions. The pawl teeth 15 are advantageously shaped so as to slope outward in the upstream direction, although this is not required in all embodiments. The upstream end 14 may include an expandable rim or lip that moves outwards when the pressure upstream of the pig 10 sufficiently exceeds the pressure downstream of the pig 10.

When the pig 10 is placed in a section of pipeline 21, the pig 10 is exposed to the various pressures inside the pipeline 21. For ease of reference, the pressure in the pipeline immediately downstream of the pig 10 is called the downstream pressure, and the pressure immediately upstream from the pig 10 is called the upstream pressure. The pig 10, and in particular the chamber 16, changes its geometry in response to changes in the upstream and downstream pressures. The pawl teeth 15 automatically displace outward (relative to axis 9) in response to a pressure differential between the upstream pressure and the downstream pressure being such that upstream pressure is less than the downstream pressure. More particularly, the higher downstream pressure is experienced in chamber 16 and causes the chamber 16 to expand. Thus, the walls of intermediate section 12, with the pawl teeth 15 thereon, expand outward. The pawl teeth 15 engage an interior surface 22 of pipeline 21, and thereby inhibit retrograde (i.e., upstream) movement of the pig 10. Thus, the pig 10 effectively acts as a moving check valve within the pipeline 21. Note that the interior surface of the pipeline may be generally smooth as is conventional, but advantageously includes a plurality of ridges, advantageously sloped ridges as shown in FIG. 2, that engage with the pawl teeth 15. When the upstream pressure becomes greater than the downstream pressure, the chamber 16 advantageously contracts, pulling the pawl teeth 15 inward with the resulting contraction of the resilient walls 8 in intermediate section 12. This contraction, and/or the sloping shape of the pawl teeth 15 if so configured, allows the pig 10 to move in the downstream direction when the upstream pressure is greater than the downstream pressure.

Figure 3:
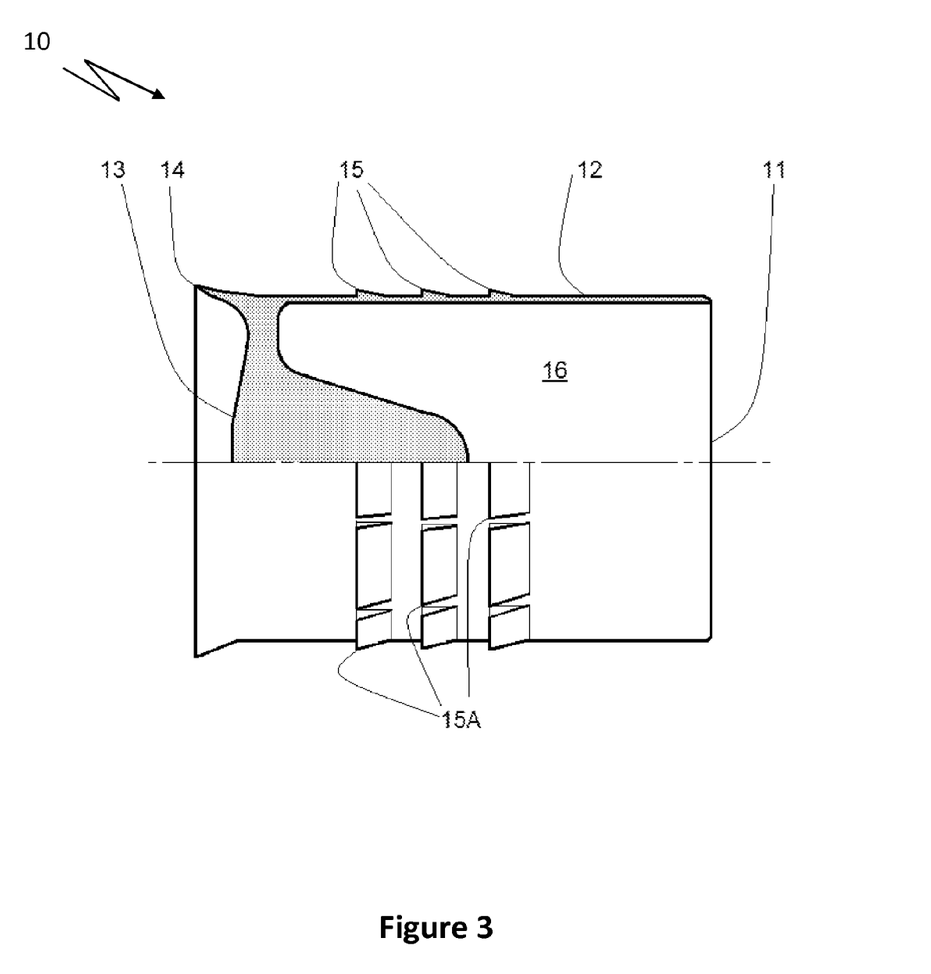
FIG. 3 shows is a side view, in partial cross-section, of an alternative embodiment of a pig, with segmented pawl teeth.

As shown in FIGS. 1-2, the pawl teeth 15 may be formed as continuous ridges that circumnavigate the chamber 16. Alternatively, as shown in FIG. 3, some or all of the pawl teeth 15 may be formed as a series of segments 15A.

Figure 4:
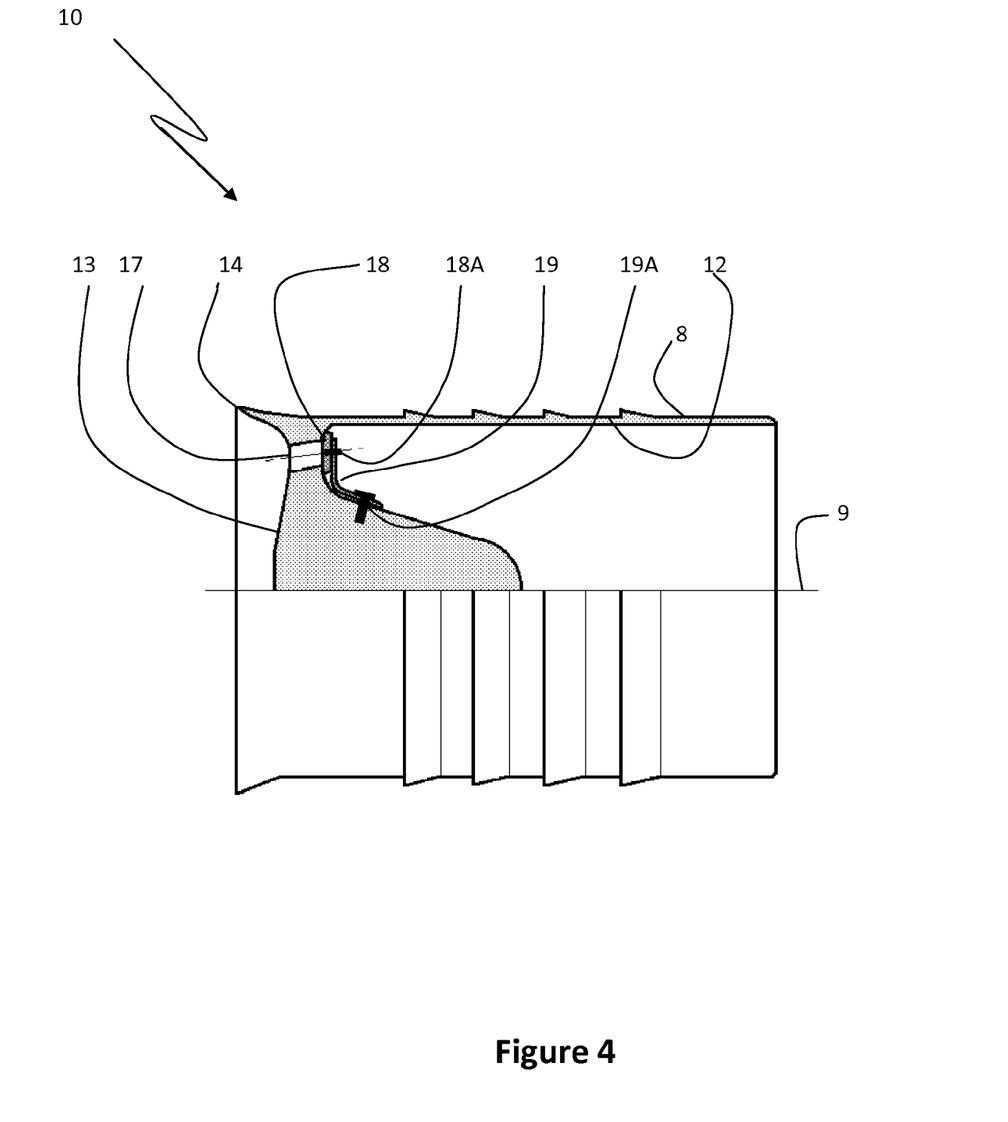
FIG. 4 shows is a side view, in partial cross-section, of another alternative embodiment of a pig, with a check valve.

As shown in FIG. 4, some embodiments of pig 10 may have one or ports 17 positioned in the wall 13, with a valve 18 associated with each port 17. The valve 18 acts to close the corresponding port 17, and the valve 18 is biased closed, such as by resilient strap 19 fastened to wall 13 by fastener 19A and to valve 18 by fastener 18A. Valve 18 advantageously operates as an internal (to the pig 10) check valve permitting a limited flow of fluid to flow through the pig 10 from upstream to downstream when the upstream pressure exceeds the downstream pressure, but preventing reverse fluid flow therethrough when the downstream pressure exceeds the upstream pressure.

Figure 5:
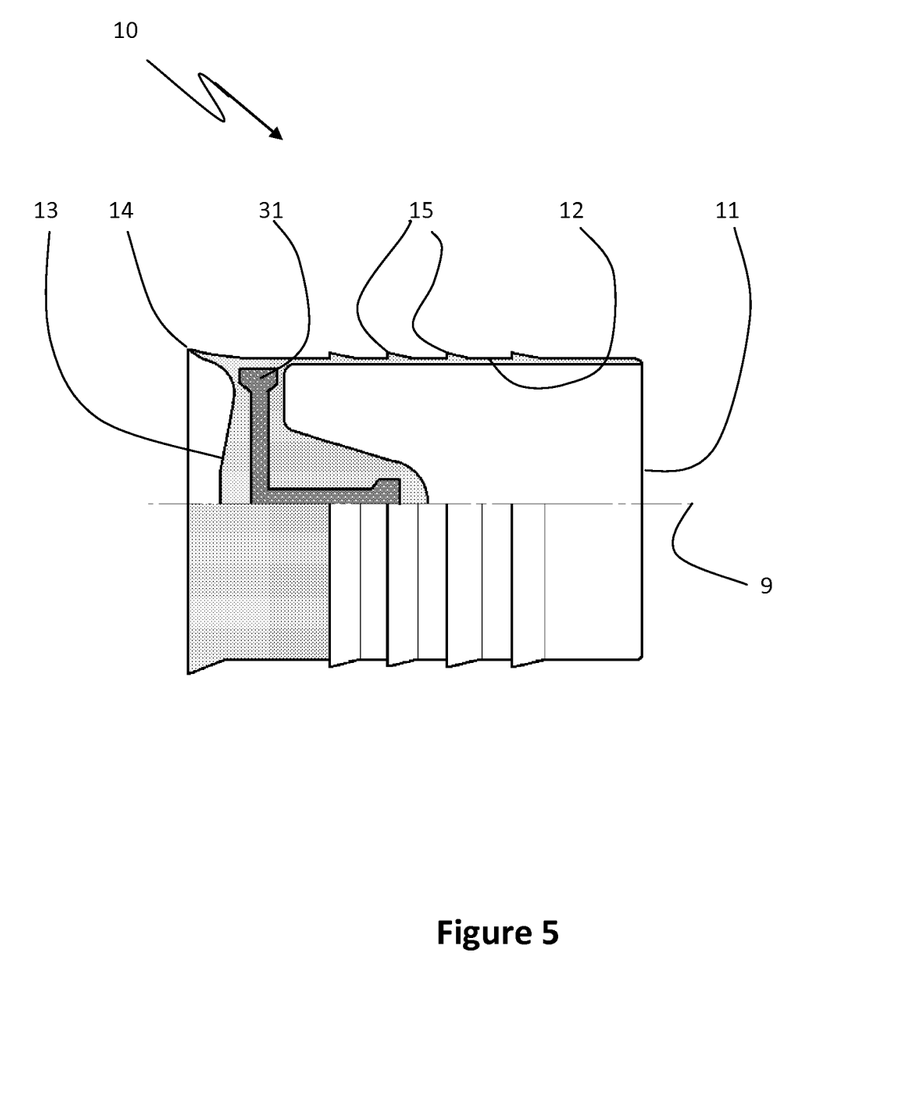
FIG. 5 shows is a side view, in partial cross-section, of another alternative embodiment of a pig, with magnets.

As shown in FIG. 5, some embodiments of pig 10 may have permanent magnetic elements 31, disposed for example in wall 13. The magnetic elements 31 advantageously have a common magnetic polarity on their ends nearest the exterior of pig 10. These ends are advantageously located quite close to the periphery of pig 10, but enclosed by pig 10.

Figure 6:
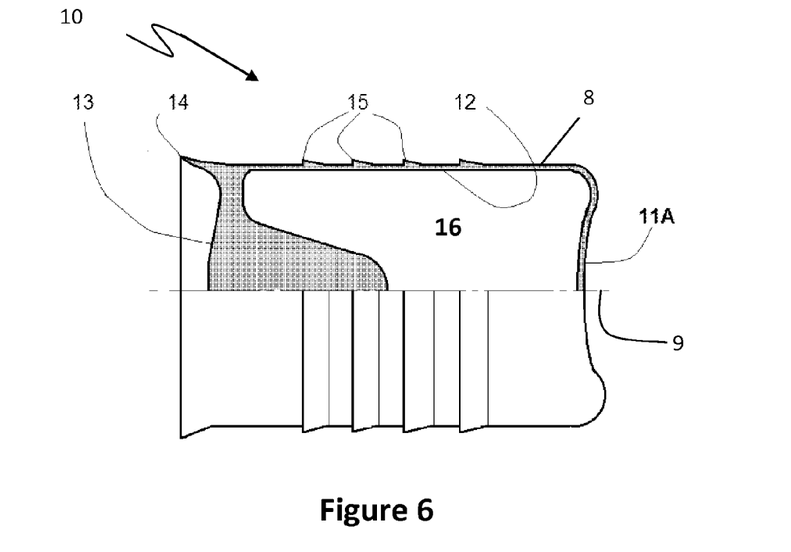
FIG. 6 shows is a side view, in partial cross-section, of another alternative embodiment of a pig, with the forward end closed.

As shown in FIG. 6, some embodiments of pig 10 have a downstream end closed by a downstream facing wall so as to enclose chamber 16. In FIG. 6, wall 11A forms the downstream face of pig 10, and encloses chamber 16. The enclosed chamber 16 is advantageously filled with an incompressible fluid.

Figure 7:
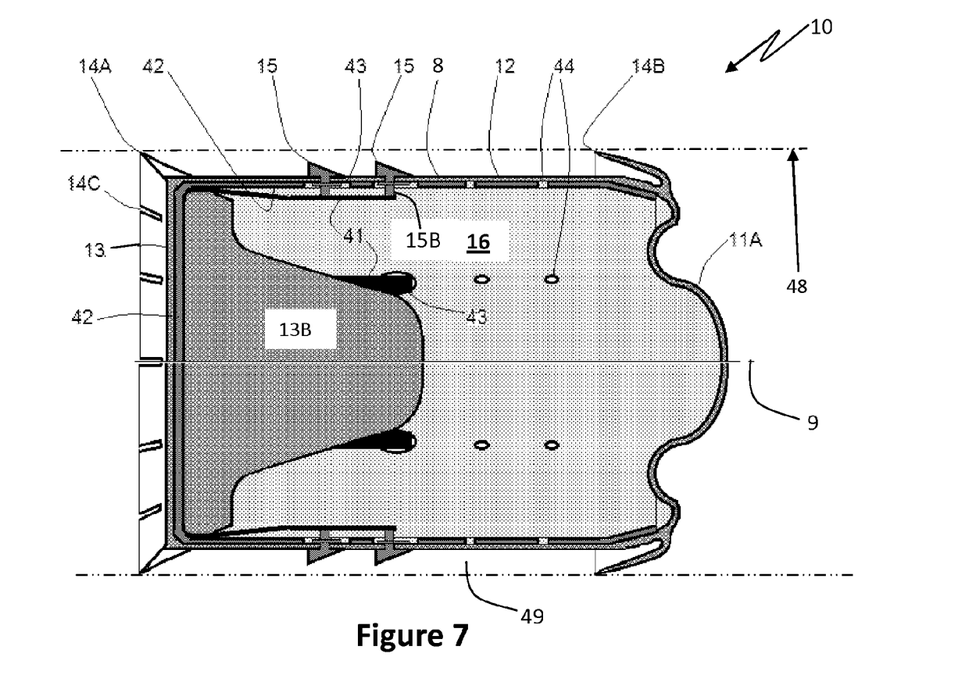
FIG. 7 shows a cross-sectional side view of another alternative pig, with peripheral rims, in a contracted state.
Figure 8:
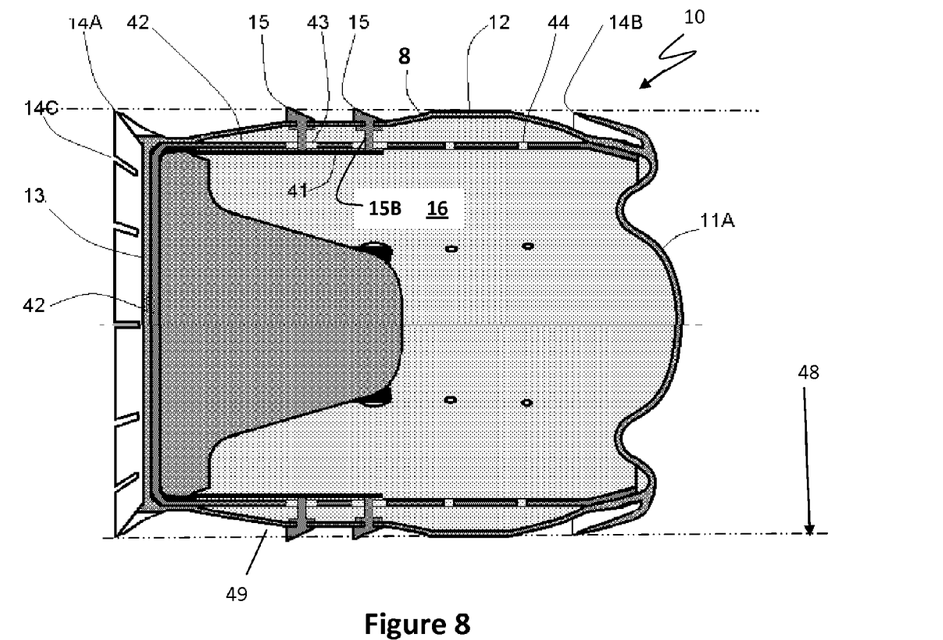
FIG. 8 shows a cross-sectional side view of the pig of FIG. 7, in an expanded state.

Referring to FIGS. 7-8, in some embodiments of pig 10, the intermediate section 12 may have a rigid internal wall 42 disposed in chamber 16, with the pawl teeth 15 extending through the wall 42. For example, an annular tube section may form wall 42, with suitable ports 43,44 in the wall 42. The internal wall 42 helps maintain the minimum shape of the pig 10, such as when the pig 10 is in the contracted or retracted state (FIG. 7). Ports 43 allow for mounting portions of the pawl teeth 15 to extend through wall 42. For example, a cantilever type arm 41 may bias the pawl teeth 15 inward and supply a mounting location for the pawl teeth 15. A mounting portion 15B of each pawl tooth 15 extends from the mount arm 41, through corresponding port 43, to the engaging portion of the corresponding pawl tooth 15. Ports 44 allow for the flow of internal fluid flow in chamber 16 between the inner and outer sides of internal wall 42. Note that the flexible outer peripheral wall 8 in intermediate section 12 is disposed outwardly from wall 42 and encloses chamber 16 in conjunction with flexible front wall 11A.

The pig 10 of FIGS. 7-8 also include an upstream rim 14A and downstream rim 14B. The rims 14A,14B are flexible and both taper toward respective tips. The tips contact the interior surface of pipe (shown in broken lines at 48) so as to form travelling seals thereagainst. Upstream rim 14A includes openings 14C, advantageously in the form of slots, that allow for fluid from the upstream side to enter the space 49 between the pipe interior surface 48 and the outer peripheral wall 8 of intermediate section 12. The upstream fluid does not flow to the downstream side due to the travelling seal formed by downstream rim 14B. Thus, the outer peripheral wall 8 of intermediate section 12 is exposed to the upstream fluid pressure.

When the downstream pressure is greater than the upstream pressure, and thus the pressure inside chamber 16, front wall 11A is displaced inward, changing the geometry of chamber 16. Because chamber 16 is fully enclosed, this results in outward displacement of the outer flexible wall 8 in the intermediate section 12, and thus outward displacement of pawl teeth 15. The pawl teeth 15 engage the pipe interior surface 48 to inhibit upstream displacement of the pig 10. See FIG. 8. Thus, the pig 10 has become in effect a closed check valve. In some embodiments, the outer peripheral wall 8 in intermediate section 12 may also contact the pipe interior surface 48, as shown in FIG. 8. When the upstream pressure increases above the downstream pressure, the pressure in space 49 against the outer peripheral wall 8 in intermediate section 12 pushes the outer peripheral wall 8 inward against the interior wall 42, thereby again changing the geometry of chamber 16. Such displacement of the outer peripheral wall of intermediate section 12 allows the pawl teeth 15 to retract inward (toward longitudinal axis 9), advantageously under the retraction bias of the corresponding mounting arms 41. See FIG. 7. When the pawl teeth 15 are retracted, the pig 10 is allowed to move downstream easily; thus, when the pawl teeth 15 are retracted, the pig 10 effectively becomes an open check valve that travels along the pipeline. Note that the fluid inside chamber 16 flows inward and outward through ports 43,44 when the chamber 16 is reacting to the changes in pressure differential between the upstream pressure and the downstream pressure.

Figure 9:
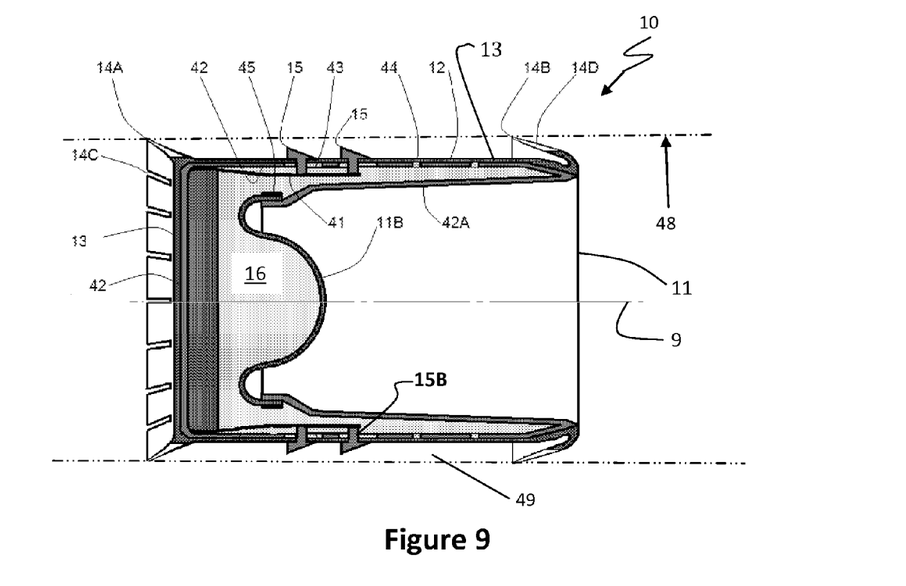
FIG. 9 shows a cross-sectional side view of another alternative pig, with a fluid filled sealed cavity, in a contracted state.
Figure 10:
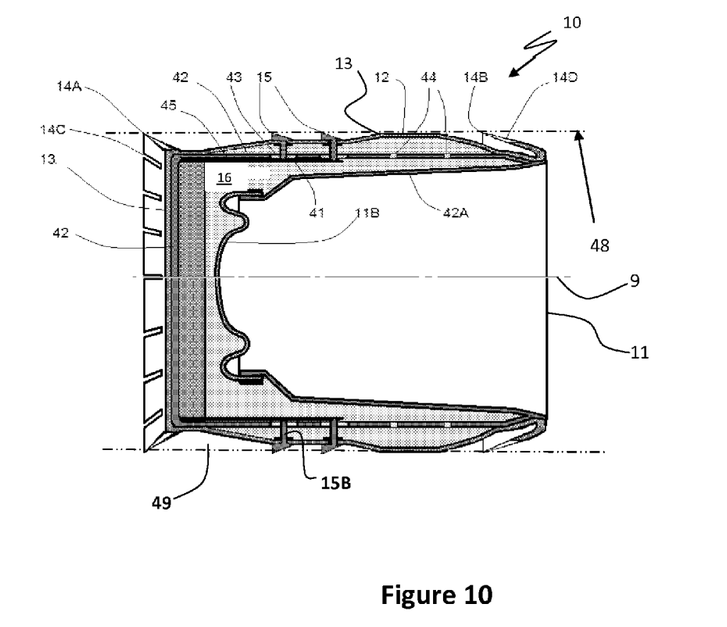
FIG. 10 shows a cross-sectional side view of the pig of FIG. 9, in an expanded state.

Another embodiment of pig 10 is shown in FIGS. 9-10. This embodiment is similar to the embodiment of FIGS. 7-8, but with a downstream facing wall 11B that is recessed significantly relative to the downstream end 11. Further, a second stiff inner wall 42A is sealingly bonded to internal wall 42 and to flexible wall 11B (such as by clamping ring 45). As with the embodiment of FIGS. 7/8, chamber 16 is fully enclosed, and contains a suitable incompressible fluid. Flexible wall 11B responds to changes in pressure differential between the upstream pressure and the downstream pressure similarly to that of front wall 11A, resulting in changes in geometry of the chamber 16. Thus, when the downstream pressure is larger than the upstream pressure, wall 11B is pushed in the upstream direction, which results in the pawl teeth 15 being deployed to engage the pipeline interior surface 48, as shown in FIG. 10. When the upstream pressure is larger than the downstream pressure, wall 11B is pushed in the downstream direction, which results in the pawl teeth 15 being retracted out of engagement with the pipeline interior surface 48, as shown in FIG. 9. A mounting portion 15B of each pawl tooth 15 extends from the mounting arm 41 and operates as described in relation to FIGS. 7-8.

An optional feature, shown in FIGS. 9-10, is that downstream rim 14B may include slits 14D that allow some fluid to pass to and from the pipe downstream from the pig 10. Thus, slits 14D allow some of the upstream fluid to bypass the pig, while still allowing the pig to move downstream. The slits 14D are advantageously smaller and/or fewer than openings 14C, which provides greater resistance to fluid flow through downstream rim 14B than upstream rim 14A. The result is a restricted fluid flow rate exiting the space 49, thereby allowing the pressure in space 49 to closely approach the upstream fluid pressure. Thus, the operation of pigs 10 having this feature is similar to that discussed above, but allowing a small portion of the upstream propelling fluid to bypass the pig 10 and join the downstream fluid when the upstream pressure exceeds the downstream pressure, somewhat similar to the bypass action discussed in relation to FIG. 4, but in a different fashion.

Figure 11:
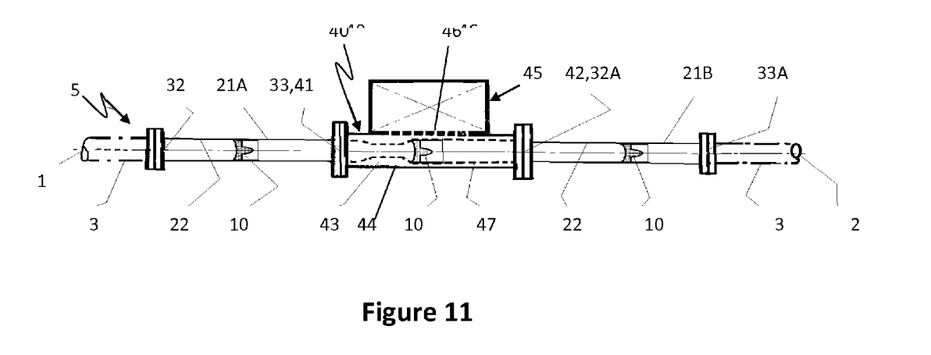
FIG. 11 shows a flexible tube propulsion unit in a transport pipeline.

The pigs 10 may be used in a variety of assemblies. For example, the pigs 10 may be used with the propulsion assembly 5 shown in FIG. 11. FIG. 11 shows a propulsion section 40 inserted in a transport pipeline 3, the pipeline 3 having an inlet 1 and an outlet 2. An inlet check valve section 21A encloses an upstream pig 10 and has its own inlet 32 and outlet 33. The internal walls of the pipeline 3 in inlet check valve section 21A has protrusions 22 to engage the pig 10. An outlet check valve section 21B encloses a downstream pig 10 and has its own inlet 32A and outlet 33A. The internal walls of outlet check valve section 21B likewise have protrusions 22 to engage the corresponding pig 10. Propulsion section 40 has a tubular chamber with rigid walls 44, and has an inlet 41 and an outlet 42. Flexible tube 47 sealingly attaches at inlet 41 and outlet 42 and encloses an intermediate pig 10. An annular space 43 is formed between the outside of the flexible tube 47 and the inside of the tubular chamber 44. Propulsion unit 45 is operatively connected to the tubular space 43 by ports 46 in the wall of the tubular chamber 44, whereby a propulsion fluid is alternately injected into the tubular space 43 by the propulsion unit 45 (thereby squeezing the flexible tube 47 towards closing it) and is alternately withdrawn from the tubular space 43 by the propulsion unit 45 (thereby expanding the closed flexible tube 47 towards opening it), to effect a continuously repeated pumping action. It is intended that pigs 10 will flow through the flexible tube 47, and therefore the propulsion section 40, as a result of the pumping action.

Figure 12:
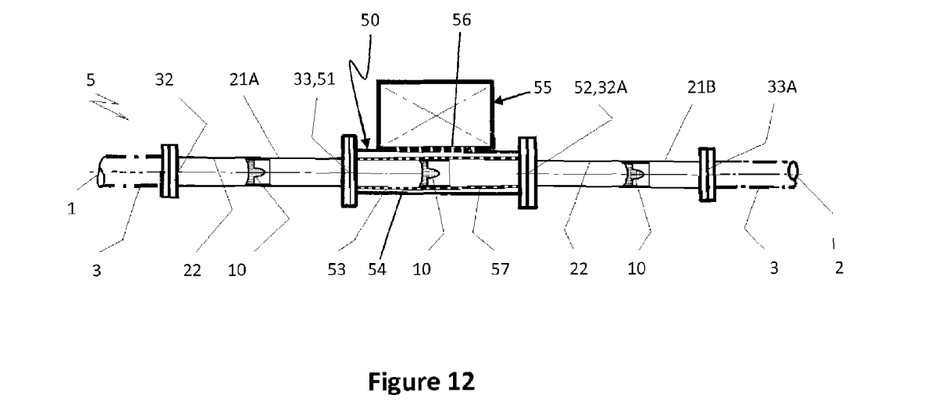
FIG. 12 shows a tubular screen propulsion unit in a transport pipeline.
Figure 14:
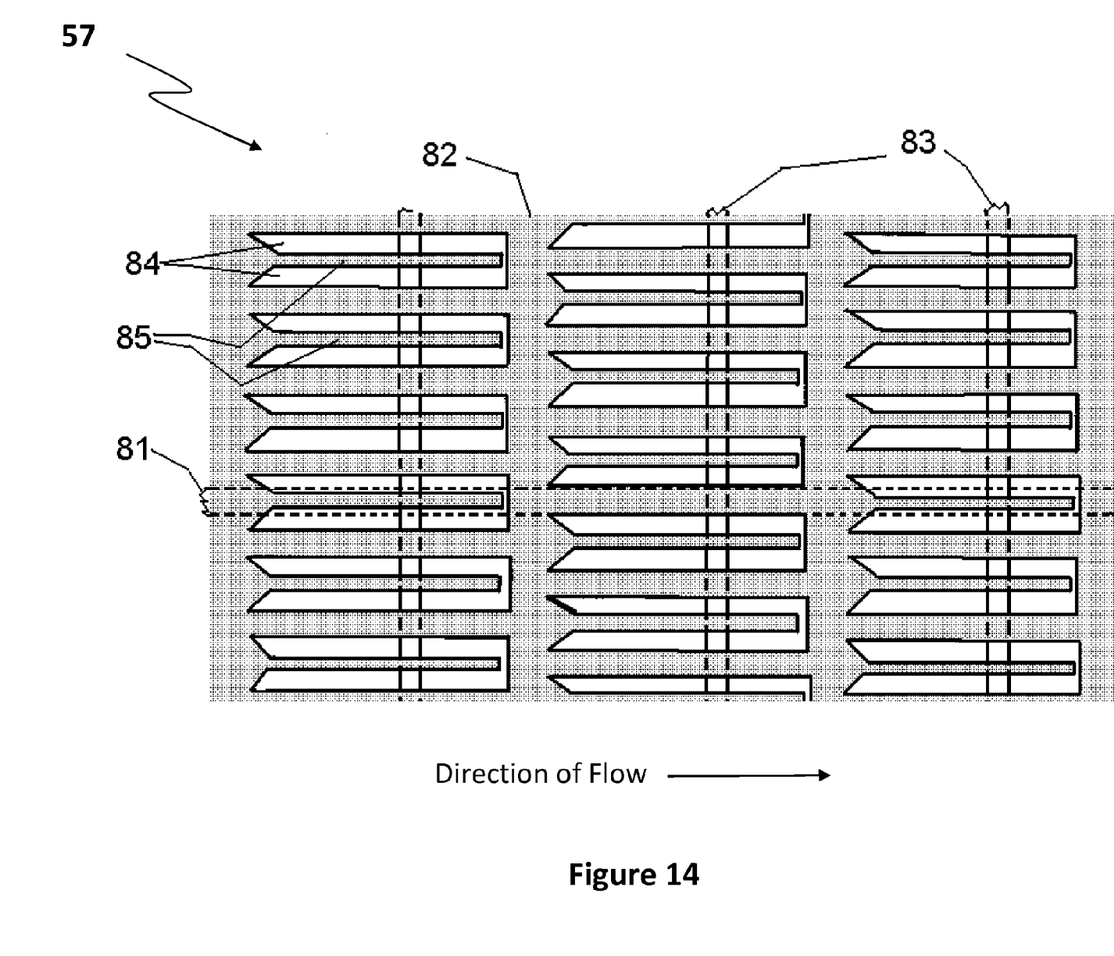
FIG. 14 shows details of the tubular screen of FIG. 12.

FIG. 12 shows a similar arrangement as FIG. 11, but with a different propulsion unit. The propulsion assembly 5 of FIG. 12 includes a propulsion section 50 having a tubular chamber 54 with rigid walls, and inlet 51 and outlet 52. A tubular screen 57 is attached at inlet 51 and outlet 52 and encloses intermediate pig 10. An annular space 53 is formed between the outside of the tubular screen 57 and the inside of the tubular chamber 54. Propulsion unit 55 is operatively connected to the tubular space 53 by ports 56 in the wall of the tubular chamber 54, whereby a propulsion fluid is alternately injected into the tubular space 53 by the propulsion unit 55 (and into the interior of the tubular screen) and is alternately withdrawn from the tubular space 53 by the propulsion unit 55 (and from the interior of the tubular screen) to effect a continuously repeated pumping action. Details of the tubular screen 57 are shown in FIG. 14. As above, is intended that pigs 10 will flow through the propulsion section 50 as a result of the pumping action.

FIG. 14 shows details of the tubular screen of FIG. 12. Tubular screen 57 includes a plurality of U-shaped slots 84 wherein un-perforated regions of the screen 82 are shown shaded and the support joists 83 (and support bearers 81 supporting the joists 83) are shown by broken lines to indicate that they are attached to the outer surface of the screen 82 to limit outwards deflection of the central strips 85, thereby limiting the size of the apertures available to fluid flowing out of the tubular screen 57. The screen 57 is a perforated thin sheet of material with resilient properties. In this example, each of the U-shaped perforations 84 have a cantilevered central strip 85 that is attached to (or continuous with) the thin sheet at one end: it is thereby free to deflect resiliently as a resilient cantilever towards the inside of the tubular screen 57 thereby increasing aperture size for fluid flowing inwardly into the tubular screen. For more information about the screen details, see U.S. Patent Application Publication No. 2011/0011790, corresponding to PCT/AU2009/000401, which is incorporated herein by reference.

Figure 13:
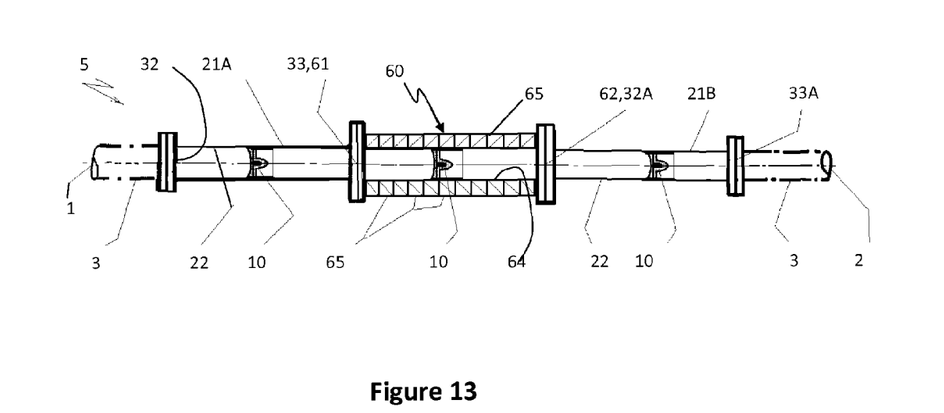
FIG. 13 shows a magnetic drive propulsion unit in a transport pipeline.

FIG. 13 shows a similar arrangement to FIG. 11, with a different propulsion unit. The propulsion section or assembly 5 of FIG. 13 includes a propulsion section 60 with a stiff tubular chamber 64 having an inlet 61 and outlet 62 and enclosing an intermediate pig 10. The stiff tubular chamber 64 is surrounded by a plurality of electrical coils 65 that selectively create a magnetic field. For pigs 10 with magnetic elements 31, such as that shown in FIG. 5, the magnetic field attracts the magnetic elements 31. The coils 65 are progressively energized to move the corresponding pig 10 within the tubular chamber 64 continuously forwards through the tubular chamber 64, thereby effecting a pumping action. As can be appreciated, is intended that pigs 10 will flow through the propulsion section 60 with the pumping action.

In some embodiments, the pigs 10 may include one or more cargo carrying compartments (not shown) for carrying cargo through the pipeline 3. Such compartments may be advantageously disposed upstream of chamber 16, or elsewhere as desired.

It will be appreciated by persons skilled in the art that numerous variations and/or modifications may be made to the invention as shown in the examples of aspects of the invention without departing from the scope of the invention as broadly described. The present aspects are, therefore, to be considered in all respects as illustrative and not restrictive, and features of any of the aspects, or their examples, may be adapted, or extended into other aspects or examples.

What is claimed is:

1. A pipeline pig for use in a pipeline having, during operation, an upstream pressure in the pipeline upstream of the pig and a downstream pressure in the pipeline downstream of the pig, the pipeline pig comprising:
    an upstream end, a downstream end, and an intermediate section disposed therebetween;
    the intermediate section having a variable geometry chamber associated therewith; the intermediate section further having one or more outwardly extending external pawl teeth;
    the one or more pawl teeth being automatically displaceable outwardly relative to a longitudinal axis in response to a pressure differential between the downstream pressure and the upstream pressure;
    wherein the pig is configured such that a change in a geometry of the chamber in response to the pressure differential between the downstream pressure and the upstream pressure causes the one or more pawl teeth to automatically displace outwardly when the upstream pressure is less than the downstream pressure.

2. The pipeline pig of claim 1:
    further comprising a flexible exterior wall associated with the intermediate section;
    wherein the chamber is circumferentially peripherally bounded by the flexible wall;
    wherein the one or more pawl teeth are configured to move with the flexible wall.

3. The pipeline pig of claim 1 wherein the chamber is fully enclosed.

4. The pipeline pig of claim 1 further comprising a downstream facing wall that forms a downstream boundary of the chamber.

5. The pipeline pig of claim 4:
    wherein the intermediate section further comprises a substantially rigid annular wall extending in the chamber, the annular wall having a plurality of ports therethrough;
    wherein the one or more pawl teeth have mounting portions extending through the annular wall.

6. The pipeline pig of claim 4 wherein the downstream facing wall is disposed downstream of the intermediate section.

7. The pipeline pig of claim 1 wherein the one or more pawl teeth comprise at least first and second external pawl teeth extending outward away from a longitudinal axis and longitudinally spaced from each other.

8. The pipeline pig of claim 1 wherein one or more pawl teeth circumferentially surround a longitudinal axis of the pig in a continuous fashion.

9. The pipeline pig of claim 1:
wherein the one or more pawl teeth are automatically displaceable inwardly and outwardly in response to a pressure differential between a downstream pressure and an upstream pressure;
wherein the pig is configured such that a change in a geometry of the chamber in response to the pressure differential between the downstream pressure and the upstream pressure causes the protrusions to move inwardly and outwardly such that:
the one or more pawl teeth automatically displace outwardly when the upstream pressure is less than the downstream pressure;
the one or more pawl teeth automatically displace inwardly when the upstream pressure is greater than the downstream pressure.

10. The pipeline pig of claim 1 wherein the one or more pawl teeth are rigid.

11. A pipeline assembly comprising:
a pipeline having an interior surface;
a pipeline pig disposed in the pipeline;
wherein the pipeline has, during operation, an upstream pressure in the pipeline upstream of the pig and a downstream pressure in the pipeline downstream of the pig;
the pipeline pig comprising:
an upstream end, a downstream end, and an intermediate section disposed therebetween;
the intermediate section having a variable geometry chamber associated therewith; the intermediate section further having one or more outwardly extending external pawl teeth;
the one or more pawl teeth being automatically displaceable outward into engagement with the interior surface of the pipeline, in response to a change in a pressure differential between the downstream pressure and the upstream pressure in the pipe, such that the upstream movement of the pig is prevented when the upstream pressure is less than the downstream pressure;
wherein downstream movement of the pig is not prevented by engagement of the one or more pawl teeth with the pipeline interior surface.

12. The pipeline assembly of claim 11 wherein the one or more pawl teeth are automatically displaceable inwardly out of engagement with the pipeline interior surface, in response to a change in the pressure differential, such that the one or more pawl teeth automatically displace inwardly when the upstream pressure is greater than the downstream pressure.

13. The pipeline assembly of claim 12:
wherein the pipeline pig comprises a flexible exterior wall in the intermediate section;
wherein an outer surface of the exterior wall:
automatically abuts the pipeline interior surface when the downstream pressure is greater than the upstream pressure;
automatically moves away from the pipeline interior surface when the downstream pressure is less than the upstream pressure.

14. The pipeline assembly of claim 11:
wherein the pipeline has a propulsion section comprising:
a propulsion unit configured to move pipeline pigs along the pipeline;
an upstream section disposed upstream of the propulsion unit;
a downstream section disposed downstream of the propulsion unit;
wherein the pipeline pig is a first pipeline pig;
further comprising a second pipeline pig, wherein the second pipeline pig comprises:
an upstream end, a downstream end, and an intermediate section disposed therebetween;
the intermediate section having a variable geometry chamber associated therewith; the intermediate section further having one or more outwardly extending external pawl teeth;
the one or more pawl teeth being automatically displaceable outward into engagement with the interior surface of the pipeline, in response to a change in a pressure differential between a downstream pressure and an upstream pressure in the pipe, such that the upstream movement of the pig is prevented when the upstream pressure is less than the downstream pressure;
wherein downstream movement of the pig is not prevented by engagement of the one or more pawl teeth with the pipeline interior surface;
wherein the first pipeline pig is disposed in the upstream section of the propulsion section and inhibited from upstream movement;
wherein the second pipeline pig is disposed in the downstream section of the propulsion section.

15. The pipeline assembly of claim 14:
wherein the propulsion section further comprises a tubular chamber having a pumping space, the tubular chamber configured for pigs to flow therethrough;
wherein the propulsion unit is configured to alternately supply motive fluid to and remove motive fluid from the pumping space.

16. A method of pumping materials through a pipeline comprising:
disposing a plurality of pipeline pigs in the pipeline such that the pipeline pigs are disposed in spaced relation to each other, with material to be pumped disposed therebetween; the plurality of pipeline pigs including a first pipeline pig;
pumping the pigs in a downstream direction;
automatically changing the configuration of the first pipeline pig during the pumping;
wherein the changing the configuration of the first pipeline pig comprises:
automatically deploying one or more pawl teeth of the first pipeline pig outwardly into engagement with an interior of the pipeline in response to a pressure differential between a downstream pressure in the pipeline experienced by the first pipeline pig and an upstream pressure in the pipeline experienced by the first pipeline pig being such that the upstream pressure is less than the downstream pressure;
automatically retracting the one or more pawl teeth inwardly in response to the pressure differential being such that the upstream pressure is greater than the downstream pressure;
wherein upstream movement of the first pipeline pig is inhibited by engagement of the one or more pawl teeth with the interior surface of the pipeline.

17. The method claim 16:
wherein the first pipeline pig comprises a variable geometry chamber;

wherein the changing the configuration of the first pipeline pig comprises changing the geometry of the chamber in response to changes in polarity of the pressure differential.

18. The method of claim 16:

wherein the pipeline comprises at least a first propulsion section;

wherein the pumping comprises passing the first pipeline pig through the first propulsion section such that the pipeline pig remains in the pipeline and spaced from adjacent pigs by the material to pumped.

* * * * *